US011142643B2

United States Patent
Chaulagain et al.

(10) Patent No.: US 11,142,643 B2
(45) Date of Patent: \*Oct. 12, 2021

(54) METHODS OF MANUFACTURE OF THERMOPLASTIC POLYMERS

(71) Applicant: SHPP Global Technologies B.V., Bergen op Zoom (NL)

(72) Inventors: Mani Raj Chaulagain, Evansville, IN (US); Roy Ray Odle, Mt. Vernon, IN (US)

(73) Assignee: SHPP GLOBAL TECHNOLOGIES B.V., Bergen op Zoom (NL)

( \* ) Notice: Subject to any disclaimer, the term of this patent is extended or adjusted under 35 U.S.C. 154(b) by 0 days.

This patent is subject to a terminal disclaimer.

(21) Appl. No.: 16/533,922

(22) Filed: Aug. 7, 2019

(65) Prior Publication Data

US 2019/0359826 A1 Nov. 28, 2019

Related U.S. Application Data

(62) Division of application No. 15/768,258, filed as application No. PCT/US2016/057167 on Oct. 14, 2016, now abandoned.

(60) Provisional application No. 62/241,541, filed on Oct. 14, 2015.

(51) Int. Cl.
| | |
|---|---|
| *C08L 81/06* | (2006.01) |
| *C08G 65/40* | (2006.01) |
| *C08G 75/23* | (2006.01) |
| *C08L 81/00* | (2006.01) |
| *C08G 75/00* | (2006.01) |
| *C08K 5/08* | (2006.01) |
| *C08K 5/13* | (2006.01) |
| *C08K 5/3417* | (2006.01) |

(52) U.S. Cl.
CPC ............. *C08L 81/06* (2013.01); *C08G 65/40* (2013.01); *C08G 75/00* (2013.01); *C08G 75/23* (2013.01); *C08K 5/08* (2013.01); *C08K 5/13* (2013.01); *C08K 5/3417* (2013.01); *C08L 81/00* (2013.01); *C08L 2207/04* (2013.01)

(58) Field of Classification Search
CPC .... C08G 73/107; C08G 73/1003; C08G 8/02; C07C 37/66; C07G 1/02; C07D 401/00
See application file for complete search history.

(56) References Cited

U.S. PATENT DOCUMENTS

| | | | |
|---|---|---|---|
| 3,875,116 A | 4/1975 | Heath et al. | |
| 4,870,155 A * | 9/1989 | Matzner | ............. C08G 73/1046 528/171 |
| 5,229,482 A | 7/1993 | Brunelle | |
| 5,514,813 A | 5/1996 | Brunelle | |
| 5,830,974 A | 11/1998 | Schmidhauser et al. | |
| 5,856,421 A | 1/1999 | Schmidhauser | |
| 5,908,915 A | 6/1999 | Brunelle | |
| 6,265,521 B1 | 7/2001 | Fyvie et al. | |
| 6,355,723 B1 | 3/2002 | Van Baal et al. | |
| 6,849,706 B1 | 2/2005 | Brunelle et al. | |
| 6,906,168 B2 | 6/2005 | Khouri et al. | |
| 6,919,418 B2 | 7/2005 | Khouri et al. | |
| 6,919,422 B2 | 7/2005 | Gallucci et al. | |
| 7,125,954 B2 | 10/2006 | Guggenheim et al. | |
| 7,312,282 B2 | 12/2007 | Trivedi et al. | |
| 7,481,959 B2 | 1/2009 | Richards et al. | |
| 7,605,222 B2 | 10/2009 | Ye et al. | |
| 7,705,190 B2 | 4/2010 | Brunelle | |
| 7,714,095 B2 | 5/2010 | Brunelle et al. | |
| 8,981,034 B2 | 3/2015 | Wu et al. | |
| 9,868,825 B2 | 1/2018 | Louis et al. | |
| 2005/0113558 A1 | 5/2005 | Johnson et al. | |
| 2005/0228149 A1 | 10/2005 | Trivedi et al. | |
| 2009/0163691 A1 | 6/2009 | Bernabe et al. | |
| 2011/0263791 A1 | 10/2011 | Chiong et al. | |
| 2014/0099510 A1 | 4/2014 | Chiong et al. | |

FOREIGN PATENT DOCUMENTS

| | | |
|---|---|---|
| CN | 1560113 A | 1/2005 |
| CN | 1803888 A | 7/2006 |
| EP | 2447300 A1 | 5/2018 |

(Continued)

OTHER PUBLICATIONS

International Search Report for International Application No. PCT/US2016/057167, International Filing Date Oct. 14, 2016, dated Mar. 29, 2017, 8 pages.

(Continued)

*Primary Examiner* — Shane Fang
(74) *Attorney, Agent, or Firm* — Cantor Colburn LLP

(57) ABSTRACT

A method of manufacture of a polyetherimide copolymer composition includes contacting a substituted phthalic anhydride and an organic diamine in the presence of diphenyl sulfone, sulfolane, or a combination comprising at least one of the foregoing solvents at a temperature of greater than 130° C. to provide a bis(phthalimide) composition comprising diphenyl sulfone, sulfolane, or a combination comprising at least one of the foregoing solvents and a bis(phthalimide); and copolymerizing the bis(phthalimide), a substituted aromatic compound, and an alkali metal salt of a dihydroxy aromatic compound in the presence of diphenyl sulfone, sulfolane, or a combination comprising at least one of the foregoing to form a polyetherimide copolymer. The method does not require any catalyst either for the imidization or the polymerization.

18 Claims, No Drawings

(56) References Cited

FOREIGN PATENT DOCUMENTS

| WO | 2007039538 A1 | 4/2007 |
| WO | 2012001131 A1 | 1/2012 |
| WO | 2014180724 A2 | 11/2014 |

OTHER PUBLICATIONS

Written Opinion for International Application No. PCT/US2016/057167, International Filing Date Oct. 14, 2016, dated Mar. 29, 2017, 8 pages.

* cited by examiner

METHODS OF MANUFACTURE OF THERMOPLASTIC POLYMERS

CROSS REFERENCE TO RELATED APPLICATIONS

This application is a divisional application of U.S. Non-Provisional application Ser. No. 15/768,258, filed on Apr. 13, 2018, which is a National Stage application of PCT/US16/057167, filed Oct. 14, 2016, which claims the benefit of U.S. Provisional Application No. 62/241,541, filed Oct. 14 2015, both of which are incorporated by reference in their entirety herein.

BACKGROUND

This disclosure relates to methods of manufacture of poly(arylene ether-sulfone), poly(arylene ketone), and polyetherimide polymer compositions.

Polyetherimide copolymers, particularly copolymers of polyetherimides with polyethersulfones or polyetheretherketones, have become important engineering polymers due to their excellent properties. One process for the manufacture of polyetherimide copolymers is by copolymerization of alkali metal salts of dihydroxyaromatic compounds, such as bisphenol A disodium salt ("BPANa$_2$"), with a substituted aromatic compound such as a substituted aromatic ketone/sulfone, and a substituted bis(phthalimide) such as a bis(halophthalimide).

Substituted bis(phthalimides) such as bis(halophthalimide)s, in turn, can be produced by imidization of a substituted or halophthalic anhydride such as 3-chlorophthalic anhydride ("3-ClPA"), 4-chlorophthalic anhydride ("4-ClPA"), or mixtures thereof with an organic diamine such as m-phenylenediamine ("mPD") or p-phenylenediamine ("pPD").

The copolymerization is typically carried out in the presence of a polymerization catalyst. In addition, because polyetherimides are usually synthesized in non-polar solvents while polyethersulfones and polyetheretherketones are synthesized in polar-aprotic solvents, the copolymerization processes require the purification and isolation of the substituted intermediate bis(phthalimide), which is cumbersome and not desirable in a commercial setting.

Thus there remains a need in the art for an improved process for the manufacture of polyetherimide copolymers that does not require a polymerization catalyst. It would be a further advantage if a substituted bis(phthalimide) can be made and used directly in the displacement polymerization without isolation and purification.

SUMMARY

A method for the manufacture of a polyetherimide copolymer composition comprises: contacting a substituted phthalic anhydride and an organic diamine in the presence of diphenyl sulfone or sulfolane or a combination comprising at least one of the foregoing solvents at a temperature of greater than 130° C., wherein the substituted phthalic anhydride has a formula

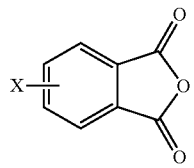

and the organic diamine has a formula $H_2N$—R—$NH_2$, to provide a bis(phthalimide) composition comprising diphenyl sulfone or sulfolane or a combination comprising at least one of the foregoing solvents and a bis(phthalimide) of the formula

and copolymerizing the bis(phthalimide), a substituted aromatic compound of the formula

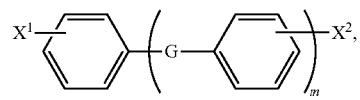

and an alkali metal salt of a dihydroxy aromatic compound of the formula MO—Z—OM in the presence of diphenyl sulfone, sulfolane, a combination comprising at least one of the foregoing solvents to form a polyetherimide copolymer comprising structural units of the formulas

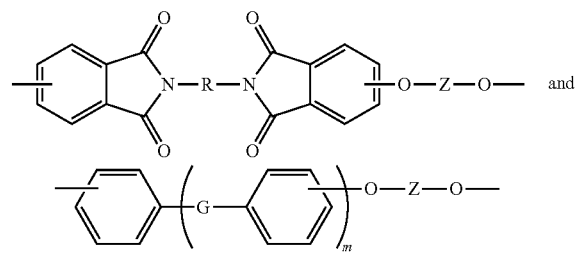

wherein in the foregoing formulae X, $X^1$, and $X^2$ are each independently fluoro, chloro, bromo, iodo, nitro, or a combination comprising at least one of the foregoing; R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —$(C_6H_{10})_z$— wherein z is an integer from 1 to 4, an aromatic hydrocarbyl moiety having from 1 to 6 aromatic groups, and a divalent group of the formula

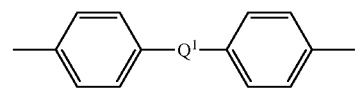

wherein $Q^1$ is —O—, —S—, —C(O)—, —$SO_2$—, —SO—, —$C_yH_{2y}$— wherein y is an integer from 1 to 5, or a combination comprising at least one of the foregoing; M is an alkali metal; Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing; G is —C(O)— or —$SO_2$—; and m is 1 or 2.

In another embodiment, a method for the manufacture of a polyetherimide copolymer composition comprises: contacting a substituted phthalic anhydride and an organic diamine in the presence of diphenyl sulfone, sulfolane, or a combination comprising at least one of the foregoing solvents at a temperature of 130° C. to 250° C., wherein the substituted phthalic anhydride has a formula

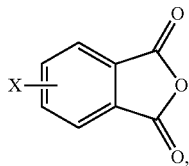

and the organic diamine has a formula $H_2N$—R—$NH_2$, to provide a bis(phthalimide) composition comprising diphenyl sulfone, sulfolane, or a combination comprising at least one of the foregoing solvents and a bis(phthalimide) of the formula

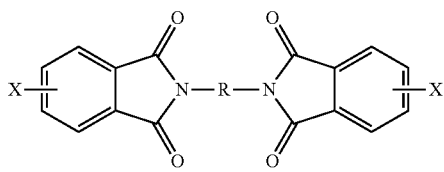

and copolymerizing the bis(phthalimide), a substituted aromatic compound of the formula

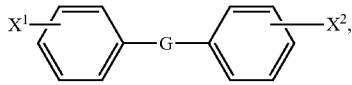

and a disodium salt or a dipotassium salt of bisphenol A in the presence of diphenyl sulfone, sulfolane, or a combination comprising at least one of the foregoing solvents to form a polyetherimide copolymer comprising structural units of the formula

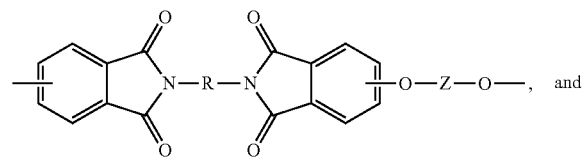

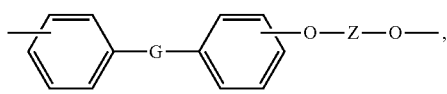

wherein in the foregoing formulae X is chloro; $X^1$ and $X^2$ are each independently chloro, fluoro, bromo, iodo, or nitro;

R is m-phenylene, p-phenylene, p,p-diphenylether, or 4,4'-diphenylsulfone; Z is

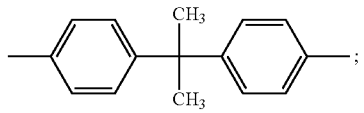

and G is —C(O)— or —$SO_2$—.

A method for the manufacture of a poly(arylene ethersulfone), a poly(arylene ketone), or a copolymer thereof comprises: polymerizing a substituted aromatic compound of the formula

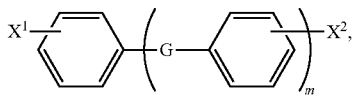

and an alkali metal salt of a dihydroxy aromatic compound of the formula MO—Z—OM in the presence of diphenyl sulfone or sulfolane or a combination comprising at least one of the foregoing solvents to form a poly(arylene ethersulfone), a poly(arylene ketone), or a copolymer thereof comprising structural units of the formula

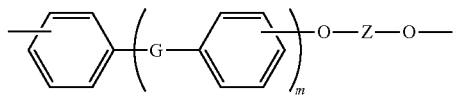

wherein in the foregoing formulas $X^1$ and $X^2$ are each independently fluoro, chloro, bromo, iodo, nitro, or a combination comprising at least one of the foregoing; M is an alkali metal; Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing; G is —C(O)— or —$SO_2$—; and m is 1 or 2.

Also disclosed is a polymer composition manufactured by the methods of the disclosure.

Still further disclosed is a polyetherimide copolymer composition wherein the polyetherimide copolymer comprises structural units of the formulas

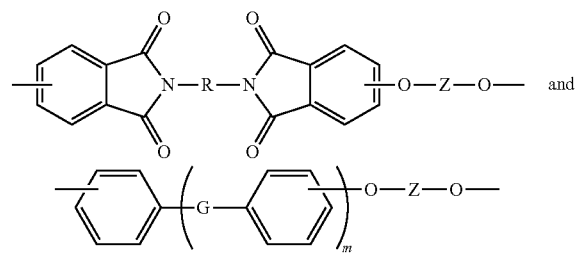

wherein R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —($C_6H_{10}$)z— wherein z is an integer from 1 to 4, an aromatic hydrocarbyl moiety having from 1 to 6 aromatic groups, and a divalent group of the formula

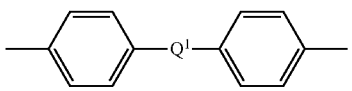

wherein $Q^1$ is —O—, —S—, —C(O)—, —SO$_2$—, —SO—, —C$_y$H$_{2y}$— wherein y is an integer from 1 to 5, or a combination comprising at least one of the foregoing; and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing; G is —C(O)— or —SO$_2$—; and m is 1 or 2; wherein the composition comprises one or more of greater than 0.1 parts per million of diphenyl sulfone, sulfolane, or a combination comprising at least one of the foregoing, or greater than 1 part per million of sodium or potassium, or a yellowness index of less than 300.

DETAILED DESCRIPTION

The inventors hereof have surprisingly found that it is now possible to make substituted bis(phthalimide)s in polar aprotic solvents having a high boiling point, for example, diphenyl sulfone, or tetramethylene sulfone without using any imidization catalyst. The prepared substituted bis(phthalimide)s in polar aprotic solvents can be used directly in displacement copolymerization without separating it from the polar aprotic solvents. In an advantageous feature, no polymerization catalyst is required for the polymerization.

The inventors have also found that poly(arylene ether-sulfone)s, poly(arylene ketone)s, or copolymers thereof can also be prepared in polar aprotic solvents having a high boiling point, for example, diphenyl sulfone, or tetramethylene sulfone. In an advantageous feature, no polymerization catalyst is required for the polymerization.

Polyetherimide copolymers produced by the methods disclosed herein comprise structure units of formula (1) and formula (1A)

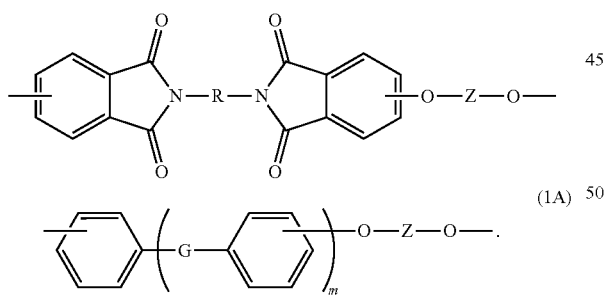

The polyetherimide copolymers have greater than 1 structural units of each of formula (1) and (1A), for example 10 to 1,000, specifically 10 to 500, or 10 to 100, preferably 10 to 50 of each of structural units (1) and (1A).

Poly(arylene ether-sulfone)s, poly(arylene ketone)s, or copolymers thereof produced by the methods disclosed herein comprise structural units of formula (1A).

The group R in formula (1) is a C$_{6-27}$ aromatic hydrocarbon group or a halogenated derivative thereof, a straight or branched chain C$_{2-20}$, specifically C$_{2-10}$ alkylene group or a halogenated derivative thereof, a C$_{3-20}$ cycloalkylene group or halogenated derivative thereof, —(C$_6$H$_{10}$)$_z$— wherein z is an integer from 1 to 4, an aromatic hydrocarbyl moiety having from 1 to 6 aromatic groups, and a group of formula (2)

wherein $Q^1$ is —O—, —S—, —C(O)—, —SO$_2$—, —SO—, —C$_y$H$_{2y}$— wherein y is an integer from 1 to 5, or a combination comprising at least one of the foregoing.

In an embodiment R is —(C$_6$H$_{10}$)$_z$— wherein z is an integer from 1 to 4 or a divalent group of formulae (3)

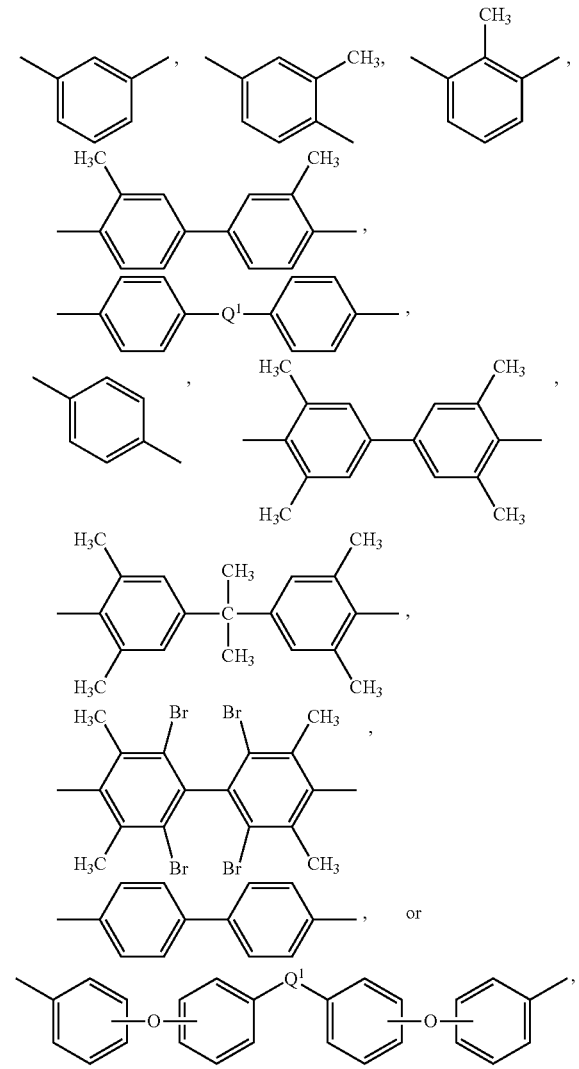

wherein $Q^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$—wherein z is an integer from 1 to 4. In some embodiments, R is the diether aromatic moiety of formula (3) having four phenylene groups wherein $Q^1$ is a direct bond, —O—, —S—, —C(O)—, —SO$_2$—, —SO—, —C$_y$H$_{2y}$— wherein y is an integer from 1 to 5. In some embodiments R is m-phenylene, p-phenylene, or a diaryl ether such as p,p-diphenylether, or a diarylsulfone such as 4,4'-diphenylsulfone. Embodiments where R is a divalent arylene ether can also be specifically mentioned, for example an arylene ether of the formula

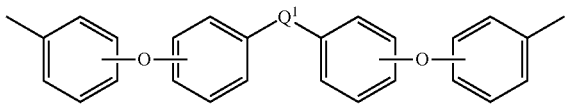
(3a)

wherein $Q^1$ is a direct bond, —O—, —S—, —C(O)—, —SO$_2$—, —SO—, —C$_y$H$_{2y}$— wherein y is an integer from 1 to 5, or a combination comprising at least one of the foregoing. In an embodiment, $Q^1$ in formula (3a) is —O—.

The group Z in formula (1) and formula (1A) is a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z include groups of formula (4)

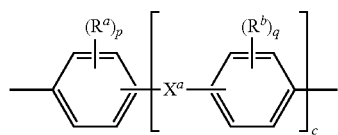
(4)

wherein $R^a$ and $R^b$ are each independently a halogen atom or a monovalent hydrocarbon group and can be the same or different; p and q are each independently integers of 0 to 4; c is 0 to 4, specifically zero or 1; and $X^a$ is a bridging group connecting the two aromatic groups, where the bridging group and point of attachment of each C$_6$ arylene group are disposed ortho, meta, or para (specifically para) to each other on the C$_6$ arylene group. The bridging group $X^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (4a)

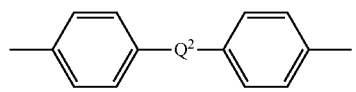
(4a)

wherein $Q^2$ is a single bond, —O—, —S—, —C(O)—, —SO$_2$—, —SO—, —C$_y$H$_{2y}$— and a halogenated derivative thereof wherein y is an integer from 1 to 5, including perfluoroalkylene groups. In a specific embodiment $Q^2$ is 2,2-isopropylidene, such that is Z is of formula (4b).

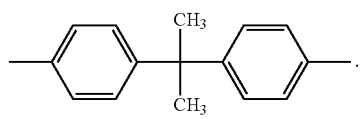
(4b)

In another specific embodiment $Q^2$ is a single bond.

The G group in formula (1A) is —C(O)— or —SO$_2$—. The substitute "m" in formula (1A) is 1 or 2, preferably 1.

In another specific embodiment, the polyetherimide copolymer comprises more than 1, specifically 10 to 100, 10 to 80, or 10 to 50 structural units, of formula (1) wherein R is a divalent group of formula (2) wherein $Q^1$ is —C$_y$H$_{2y}$— wherein y is an integer from 1 to 5, and Z is a group of formula (4a) wherein $Q^2$ is —O—, —S—, —C(O)—, —SO$_2$—, —SO—, or —C$_y$H$_{2y}$— or a halogenated derivative thereof wherein y is an integer from 1 to 5; and more than 1, specifically 10 to 100, 10 to 80, or 10 to 50 structural units, of formula (1A) wherein —C(O)— or —SO$_2$—and m is 1. In some embodiments, R is m-phenylene, p-phenylene, p,p-diphenylether, 4,4'-diphenylsulfone, or a combination comprising at least one of the foregoing, and Z is 2,2-(4-phenylene)isopropylidene. In some embodiments, the polyetherimide copolymer is a polyetherimide sulfone copolymer. A specific polyetherimide sulfone copolymer comprises structural units of formula (1) wherein at least 50 mole percent of the R groups are of formula (4a) wherein $Q^2$ is —SO$_2$— and the remaining R groups are independently p-phenylene or m-phenylene or a combination comprising at least one of the foregoing; and Z is 2,2-(4-phenylene) isopropylidene; and structural units of formula (1A).

The polyetherimide copolymers are prepared first by imidization of a substituted phthalic anhydride with an organic diamine in diphenyl sulfone, sulfolane, or a combination comprising at least one of the foregoing solvents to form a bis(phthalimide), followed by copolymerization of the bis(phthalimide) with a substituted aromatic compound and an alkali metal salt of a dihydroxy aromatic compound in diphenyl sulfone, sulfolane, or a combination comprising at least one of the foregoing solvents. In this method, a substituted phthalic anhydride of formula (7)

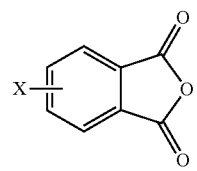
(7)

wherein X is a leaving group (such as a nitro group or a halogen), is condensed (imidized) with an organic diamine of formula (8)

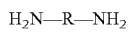

H$_2$N—R—NH$_2$ (8)

wherein R is as described in formula (1), in the presence of diphenyl sulfone at a temperature of greater than 130° C. to form a composition comprising bis(phthalimide) of formula (9) and diphenyl sulfone, sulfolane, or a combination comprising at least one of the foregoing solvents

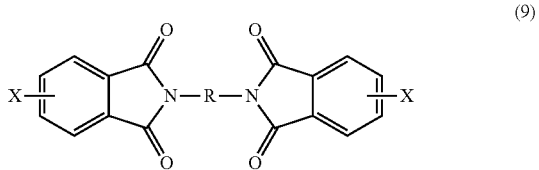

(9)

wherein X is a leaving group as in formula (7) and R is a linker as described in formula (1).

In an embodiment, X is a nitro group or a halogen, specifically fluoro, chloro, bromo, iodo, more specifically chloro. A mixture of different X groups can be used.

Illustrative examples of amine compounds of formula (8) are described in U.S. Pat. Nos. 3,875,116; 6,919,422 and 6,355,723 for example. Combinations comprising any of the foregoing amines can be used. Specifically, diamine (8) is a meta-phenylene diamine (8a), a para-phenylene diamine (8b), or a diamino diaryl sulfone (8c), or an arylene ether (8d)

(8a)

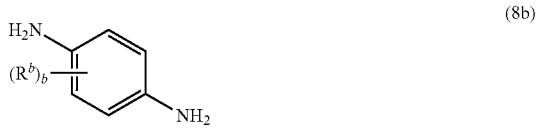

(8b)

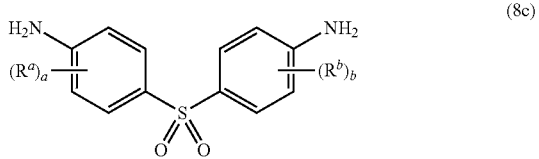

(8c)

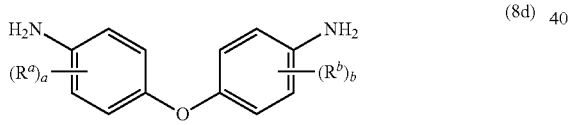

(8d)

wherein $R^a$ and $R^b$ are each independently a halogen atom, nitro, cyano, $C_2$-$C_{20}$ aliphatic group, $C_2$-$C_{40}$ aromatic group, and a and b are each independently 0 to 4. Specific examples include meta-phenylenediamine (mPD), para-phenylenediamine (pPD), 2,4-diaminotoluene, 2,6-diaminotoluene, 2-methyl-4,6-diethyl-1,3-phenylenediamine, 5-methyl-4,6-diethyl-1,3-phenylenediamine, 1,3-diamino-4-isopropylbenzene, 4,4'-oxydianiline (ODA), bis(aminophenoxy phenyl) sulfones (BAPS) and 4,4'-diamino diphenyl sulfone (DDS). In some embodiments of bis(phthalimide) (9), X is chloro or fluoro, specifically chloro, and R is m-phenylene, p-phenylene, an arylene ether such as p,p-diphenylether, a diarylsulfone such as diphenylsulfone, or a combination comprising at least one of the foregoing.

The substituted phthalic anhydride of formula (7), the organic diamine of formula (8), and diphenyl sulfone, sulfolane, or a combination comprising at least one of the foregoing solvents can be combined in any order. In an embodiment, the diphenyl sulfone is first heated to a molten state, then the substituted phthalic anhydride of formula (7), the organic diamine of formula (8) are added to the molten diphenyl sulfone either alone, or in combination.

In an advantageous feature, the condensation of a substituted phthalic anhydride of formula (7) and an organic diamine of formula (8) (imidization) is conducted without any imidization catalysts typically used in imidization reactions.

The bis(phthalimide)s (9) are generally prepared at least at 130° C., specifically 150° to 275° C., more specifically 160 to 250° C. Atmospheric or super-atmospheric pressures can be used, for example up to 5 atmospheres, to facilitate the use of high temperatures without causing solvent to be lost by evaporation.

The reaction of the substituted phthalic anhydride (7) with the organic diamine (8) to form bis(phthalimide) (9) is generally conducted for 0.5 to 30 hours, specifically 1 to 20 hours, more specifically 1 to 10 hours, still more specifically 2 to 8 hours, and yet more specifically 3 to 7 hours. Advantageously, conversion to the bis(phthalimide) is 99% complete, based on the moles of the substituted phthalic anhydride, in less than 6 hours.

The diphenyl sulfone, sulfolane, or a combination comprising at least one of the foregoing solvents, organic diamine (8), and substituted phthalic anhydride (7) can be combined in amounts such that the total solids content during the reaction to form bis(phthalimide) (9) does not exceed 80 weight percent (wt. %), or does not exceed 60 wt. %. For example, the total solids content can be 1 to 40 wt. %, or 1 to 30 wt. %, or 1 to 25 wt. %. "Total solids content" expresses the proportion of the reactants as a percentage of the total weight including liquids such as molten diphenyl sulfone, sulfolane, or a combination comprising at least one of the foregoing solvents present in the reaction at any given time.

In an embodiment, the amount of diphenyl sulfone or sulfolane is adjusted based on the amount of bis(phthalimide) (9). In particular, the amount is based on the weight of the bis(phthalimide) (9) divided by the sum of the weight of the bis(phthalimide) (9) plus the weight of the diphenyl sulfone or sulfolane as follows:

$$\frac{\text{weight of bis(phthalimide) (9)}}{\text{weight of bis(phthalimide) (9) + weight of diphenylsulphone or sulfolane}} (100)$$

and can be 1 to 30%, specifically 15 to 25%, or 18 to 22%.

It can be desirable to have low water content in the imidization reaction mixture. Thus, in some embodiments, the combined substituted phthalic anhydride, organic diamine, and diphenyl sulfone, sulfolane, or a combination comprising at least one of the foregoing can comprise less than or equal to 200 parts per million parts of the combined components weight (ppm) of water, more specifically, less than or equal to 100 ppm of water, still more specifically, less than or equal to 50 ppm of water, or, yet more specifically, less than or equal to 25 ppm of water. In some embodiments, the combined substituted phthalic anhydride, organic diamine, and diphenyl sulfone, sulfolane, or a combination comprising at least one of the foregoing solvents comprise less than or equal to 100 ppm water.

A molar ratio of substituted phthalic anhydride (7) to diamine (8) of 1.95:1 to 2.05:1, specifically 1.98:1 to 2.02:1, more specifically 1.98:1 to 2.01:1, or 2:1 can be used. While other ratios can be employed, a slight excess of anhydride can be desirable. A proper stoichiometric balance between substituted phthalic anhydride (7) and diamine (8) is maintained to prevent undesirable by-products that can limit the molecular weight of the polyetherimide polymer prepared from the bis(phthalimide), and/or result in polymers with amine end groups. Accordingly, in an embodiment, the imidization process includes contacting diamine (8) with substituted phthalic anhydride (7) in the presence of diphenyl sulfone, sulfolane, or a combination comprising at least one of the foregoing solvents at a temperature of greater than 130° C. to form a reaction mixture having a targeted initial molar ratio of substituted phthalic anhydride to diamine; further heating the reaction mixture; analyzing the molar ratio of the further heated reaction mixture to determine the actual initial molar ratio of substituted phthalic anhydride (7) to diamine (8); and, if necessary, adding substituted phthalic anhydride (7) or diamine (8) to the analyzed reaction mixture to adjust the molar ratio of substituted phthalic anhydride (7) to diamine (8) to the desired value, for example 1.98:1 to 2.02:1.

In some embodiments the imidization is conducted in the presence of an endcapping agent. The endcapping agent can be formed before or during imidization by addition of a monofunctional reactant that reacts with one of the amine groups of diamine (8). Such mono-capped diamines endcap the polymer during polymerization, and thus can be used to control the molecular weight of the polymer or the identity of the end groups of the polymer. Accordingly, the monofunctional reactant has a functional group that reacts with an amine of diamine (8) for example, a phthalic anhydride, acyl alkyl halide, acyl aryl halide, aldehyde, ketone, ester, isocyanate, chloroformate, sulfonyl chloride, a phenate, and the like. A combination of different monofunctional reactants can be present. In an embodiment the monofunctional reactant is a phthalic anhydride without a halogen, nitrogen, or other leaving group substitution. For example, when a combination of substituted phthalic anhydride (7) and unsubstituted phthalic anhydride are reacted with organic diamine (8), the product comprises bis(phthalimide) (9) and monofunctional bis(phthalimide) (18)

(18)

wherein R and X are as defined in formula (9).

The amount of monofunctional reactant added will depend on the desired amount of endcapping agent. For example, the amount of monofunctional reactant present in the imidization reaction can be more than 0 to 10 mole percent, specifically 1 to 10 mole percent, and more specifically to 6 mole percent, based on total moles of substituted phthalic anhydride (7). The monofunctional reactant can be added at any time, e.g., to the diamine (8), the substituted phthalic anhydride (7), the solvent, or a combination thereof, before or after imidization has started, in the presence or absence of the imidization catalyst.

Alternatively, or in addition to the above monofunctional reactants, or monofunctional bis(phthalimides) can be added as endcapping agents. Thus, in some embodiments, the method further comprises the direct addition of an endcapping agent such as a monofunctional bis(phthalimide) (18). Thus, imidization can be conducted by stepwise, simultaneously or essentially simultaneously combining the reactants, i.e., substituted phthalic anhydride (7), organic amine (8), solvent, imidization catalyst, and the monofunctional reactant or endcapping agent such as a monofunctional bis(phthalimide).

The bis(phthalimide) composition comprising diphenyl sulfone can be used for the subsequent polymerization step, described below, without purification. Alternatively, the bis (phthalimide) composition can be subject to further purification as is known in the art before polymerization.

After imidization, the bis(phthalimide) (9)

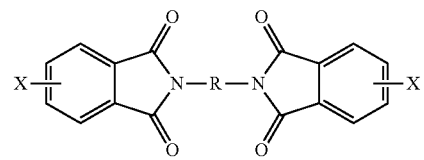
(9)

is copolymerized with a substituted aromatic compound of formula (12)

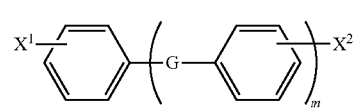
(12)

and an alkali metal salt of a dihydroxy aromatic compound of formula (10)

MO—Z—OM (10)

wherein M is an alkali metal and Z is as described in formula (1), to provide the polyetherimide having structural units of formulas (1) and (1A)

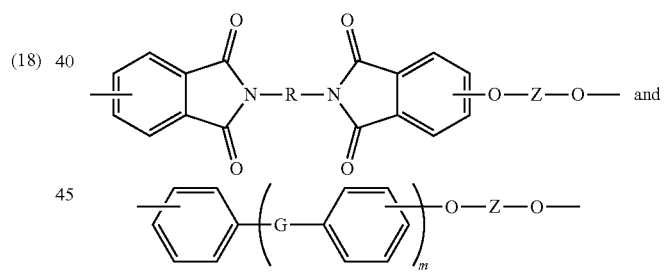

wherein $X^1$ and $X^2$ are each independently fluoro, chloro, bromo, iodo, nitro, or a combination comprising at least one of the foregoing, G, m, n, X, R, and Z are as defined above.

The poly(arylene ether-sulfone)s, poly(arylene ketone)s, or copolymers thereof are prepared by polymerizing a substituted aromatic compound of the formula (12) and an alkali metal salt of a dihydroxy aromatic compound of the formula (10) in the presence of diphenyl sulfone or sulfolane or a combination comprising at least one of the foregoing solvents.

Alkali metal M can be any alkali metal, for example lithium, sodium, potassium, and cesium. Thus alkali metal salt (10) is a lithium salt, sodium salt, potassium salt, cesium salt, or a combination comprising at least one of the foregoing. Specific alkali metals are potassium or sodium. In preferred embodiments herein, M is potassium. The alkali metal salt can be obtained by reaction of a metal hydroxide with aromatic $C_{6-24}$ monocyclic or polycyclic dihydroxy aromatic compound optionally substituted with 1 to 6 $C_{1-8}$ alkyl groups, 1 to 8 halogen atoms, or a combination thereof, for example a dihydroxy aromatic compound of formula (11):

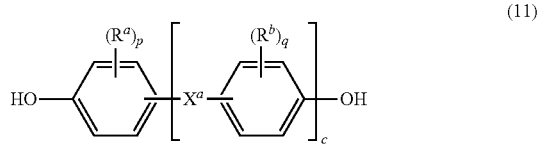

(11)

wherein $R^a$, $R^b$, and $X^a$ are as described in formula (4). In some embodiments the dihydroxy aromatic compound is bisphenol A, hydroquinone, biphenol, resorcinol, or a combination comprising at least one of the foregoing. For example, the dihydroxy aromatic compound can be 2,2-bis (4-hydroxyphenyl) propane ("bisphenol A" or "BPA"). The alkali metal salt can be used in a powder form or in a slurry form. The slurry form of the alkali metal salt comprises an alkali metal salt dispersed in a solvent such as ortho-dichlorobenzene, toluene, molten diphenyl sulfone, sulfolane, and xylenes. Once combined with bis(phthalimide) (9), the solvent in the slurry of alkali metal salt can be removed before the polymerization reaction starts. In an embodiment, the slurry form comprises an alkali metal salt dispersed in ortho-dichlorobenzene. In still another embodiment, the alkali metal salt is formed in-situ during the copolymerization by reacting an alkali metal salt with an aromatic compound of formula (11). As a specific example, a potassium salt of bisphenol A can be generated in situ during the copolymerization by reacting $K_2CO_3$ with bisphenol A.

In an embodiment, the substituted aromatic compound (12) is 4,4'-difluorobenzophenone, 4,4'-dichlorodiphenylsulfone, or a combination comprising at least one of the foregoing.

Advantageously, copolymerization of bis(phthalimide) (9) in diphenyl sulfone, sulfolane, or a combination comprising at least one of the foregoing solvents with alkali metal salt (10) and substituted aromatic compound (12) can be conducted without the presence of a polymerization catalyst. Similarly polymerization of one or more of a substituted aromatic compound of formula (12) with alkali metal salt (10) in diphenyl sulfone, sulfolane, or a combination comprising at least one of the foregoing solvents can be conducted without the presence of a polymerization catalyst. In another embodiment, the copolymerization and polymerization are conducted in the presence of a polymerization catalyst. Examples of polymerization catalysts are crown ether, the quaternary ammonium salts, quaternary phosphonium salts, guanadinium salts, pyridinium salts, imidazolium salts, in particular guanidinium salts. Examples of guanidinium salts are hexaalkylguanidinium and α,ω-bis (pentaalkylguanidinium)alkane salts, and an example of a hexaalkylguanidinium salt is hexaethylguanidinium chloride.

If necessary, additional diphenyl sulfone can be added. Other non-polar solvents, preferably with a boiling point above 100° C., specifically above 150° C., for example o-dichlorobenzene, dichlorotoluene, 1,2,4-trichlorobenzene, a monoalkoxybenzene such as anisole, veratrole, diphenylether, or phenetole, can be added. Preferably polar aprotic solvents such as dimethylformamide (DMF), dimethylacetamide (DMAc), dimethylsulfoxide (DMSO), tetramethylene sulfone (sulfolane), or N-methylpyrrolidinone (NMP) are not used as a solvent or a co-solvent. In an embodiment, no NMP is present. In an embodiment, the copolymerization and polymerization are carried out in diphenyl sulfone, sulfolane, or a combination comprising at least one of the foregoing and no other solvents are used. A total solids content of the bis(phthalimide) (9) in the copolymerization can be as described above, for example 15 to 25 wt. %, based on the total weight of the polymerization mixture. "Total solids content" refers to the proportion of the reactants as a percentage of the total weight of the polymerization mixture, including solvents, such as diphenyl sulfone, sulfolane, or a combination comprising at least one of the foregoing solvent.

Copolymerization and polymerization can be conducted at least 110° C., specifically 150° to 275° C., more specifically 160 to 250° C. Atmospheric or super-atmospheric pressures can be used, for example up to 5 atmospheres, to facilitate the use of high temperatures without causing solvent to be lost by evaporation.

The copolymerization and polymerization can be conducted for 0.5 to 30 hours, specifically 1 to 20 hours, more specifically 1 to 10 hours, still more specifically 2 to 8 hours, and yet more specifically 3 to 7 hours. The yellowness index of polyetherimide copolymer can depend on the polymerization time such that the longer the polymerization time, the higher the yellowness index. Thus it is generally desirable to minimize the polymerization time.

In some embodiments, random copolymers are prepared by bringing the alkali metal salt (10), the bis(phthalimide) (9), and the substituted aromatic compound (12) into contact in proportions such at the molar ratio of the alkali metal salt (10) to the total of the bis(phthalimide) (9) and the substituted aromatic compound (12) is in the range of 0.95:1 to 1.1:1. For poly(arylene ether-sulfone)s, poly(arylene ketone) s, or copolymers thereof, the molar ratio of the alkali metal salt (10) to the substituted aromatic compound (12) is in the range of 0.95:1 to 1.1:1. For maximum molecular weight, the amounts should be as close as possible to exactly equimolar but molecular weight control may also be achieved by employing one reagent or the other in slight excess. Molecular weight can also be controlled by varying the amount of endcapping agent present in the bis(phthalimide) composition (e.g. phthalic anhydride) or added to the polymerization reaction (e.g. sodium phenate).

In other embodiments, the alkali metal salt (10) is first brought into contact with the bis(phthalimide) (9) or the substituted aromatic compound (12) and then with the other of the monomers (9) or (12) respectively. The first step of this 2-step procedure employs a slight excess, for example, 1 molar percent to 3 molar percent, of one monomer, most often the alkali metal salt (10), to provide an intermediate having reactive phenol end groups. Further alkali metal salt (10) is then added in combination with an approximately equimolar amount of the other of monomers (9) and (12). A block polyetherimide copolymer can be formed. This procedure allows control of molecular weight. Alternatively, molecular weight can be controlled by adjusting the type and amount of chain stopper present in the monomer (e.g., phthalic anhydride) or during polymerization (e.g., sodium phenate).

Water removal from the system can be accomplished in either batch, semi-continuous or continuous processes using means known in the art such as a distillation column in conjunction with one or more reactors. Other methods for water removal include passing the condensed distillate through a drying bed for chemical or physical adsorption of water.

The bis(phthalimide) composition and the polyetherimide copolymer composition can be manufactured in separate vessels. Advantageously, since the bis(phthalimide) composition can be used directly in the copolymerization reaction without purification, the bis(phthalimide) composition and the polyetherimide copolymer composition can be manufactured in the same vessel. As described above, in some embodiments an endcapping agent is formed during imidization or added to the imidization. Alternatively, the copolymerization further comprises the addition of an endcapping agent. The endcapping agent can be a substituted phthalimide (e.g., 4-chloro-N-phenylphthalimide), the monofunctional bis(phthalimide) (18), or a monofunctional alkali metal phenate. Exemplary phenates include salts of any monophenol and p-cumyl phenol. The monofunctional bis(phthalimide) (18) can be generated or added to the imidization reaction. The monofunctional alkali metal phenate can be added to the copolymerization reaction mixture when an alkali metal salt of a dihydroxy aromatic compound is added. The amount of the endcapping agent can vary. The endcapping agent can be added stepwise, simultaneously or essentially simultaneously with the bis(phthalimide) (9) and the alkali metal salt (10).

After polymerization, the polymer is isolated. For example, the reaction mixture can be cooled, and the polymer solidified. The polymer can be broken and ground to a powder, then slurried with a solvent miscible with the diphenyl sulfone or sulfolane (e.g., acetone), and the polymer separated from the acetone (e.g., by filtration or centrifugation) to remove residual diphenyl sulfone or sulfolane. Byproduct salt (e.g., NaCl) can be removed from the product by the polymer washing with water, for example acidified water. The polymer can again be isolated (e.g., filtered or centrifuged), dried (by, for example washing with acetone, followed by oven drying). For convenience, the polymer can then be extruded to form pellets. Other methods for isolation can be used, for example quenching, followed by addition of a solvent such as methylene chloride to form a suspension and dissolve the polymer. Any contaminating solid can be removed, and the polymer solution added to a solvent such as acetone to precipitate the polymer while leaving the diphenyl sulfone or sulfolane in solution with the acetone. The polymer can be further washed and dried.

In an embodiment, the poly(arylene ether-sulfone), poly(arylene ketone), and polyetherimide polymer compositions manufactured according to the methods of the disclosure contain greater than 0.1 parts per million of diphenyl sulfone, sulfolane, or a combination comprising at least one of the foregoing solvents, based on the total weight of the composition. For example, a sample of the polymer compositions can contain 0.1 to 10,000 parts per million of diphenyl sulfone, sulfolane, or a combination comprising at least one of the foregoing solvents, or 1 to 1,000 parts per million of diphenyl sulfone, sulfolane, or a combination comprising at least one of the foregoing solvents, or 0.1 to 100 parts per million of diphenyl sulfone, sulfolane, or a combination comprising at least one of the foregoing solvents, each based on the total weight of the composition. In other embodiments, the polymer compositions can have greater than 1 part per million of sodium or potassium based on the total weight of the composition. For example, a sample of the polymer compositions can contain 1 to 10,000 parts per million of sodium or potassium, or 10 to 10,000 parts per million of sodium or potassium, or 10 to 1,000 parts per million of sodium or potassium, each based on the total weight of the composition. The polymers can have a yellowness index of less than 300 or less than 250. Yellowness Index (YI) is measured according to ASTM E313-98. ASTM D-1925 is also an acceptable method. Generally, the YI is a number calculated from spectrophotometric data that describes the color of a test sample as being clear or white (low YI) versus being more yellow (high YI). Sample handling and preparation can affect the test results. The yellowness index of the polymer pellets is determined by dissolving 0.5 grams of polymer pellets in 10 mL of methylene chloride, and measuring the YI of the resulting solution on an Xrite 7000 Color Eye device (Xrite, Incorporated) in accordance with ASTM E313-98. The poly(arylene ether-sulfone), poly(arylene ketone), and polyetherimide polymer compositions manufactured according to the methods of the disclosure have a Tg of 145° C. to 205° C. The polymer compositions also have an onset weight loss temperature of 450° C. to 550° C. upon heating under nitrogen or air using a thermogravimetric analysis (TGA) at a heating rate of 20° C. per minute. Further, the polymer compositions have a polydispersity index (PDI) of 1.5 to 5 as measured by GPC using a UV-VIS detector and polystyrene standards.

The poly(arylene ether-sulfone), poly(arylene ketone), and polyetherimide polymers can be formulated to provide a wide variety of compositions for the manufacture of articles. The compositions can optionally comprise a filler. In some instances it is desired to have polymer compositions wherein a filler is substantially absent. "Substantially absent" means that the composition has less than 3 wt. % of a filler, and in other embodiments less than 1 wt. % filler by weight of the composition. In other instances, it is advantageous to have polymer compositions wherein a filler is absent.

The poly(arylene ether-sulfone), poly(arylene ketone), and polyetherimide polymer compositions can include various additives ordinarily incorporated into polymer compositions of this type, with the proviso that the additives are selected so as to not significantly adversely affect the desired properties of the composition. Exemplary additives include catalysts, impact modifiers, fillers, antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame retardants, anti-drip agents, and radiation stabilizers. In some embodiments, the polyetherimide composition comprises a solvent, and the composition is in the form of a varnish. Combinations of additives can be used, for example a combination of a heat stabilizer, a mold release agent, and optionally an ultraviolet light stabilizer. In general, the additives are used in the amounts generally known to be effective. The foregoing additives (except any fillers) are generally present in an amount from 0.005 to 20 wt. %, specifically 0.01 to 10 wt. %, based on the total weight of the composition. Alternatively, in some embodiments, our compositions do not contain appreciable amounts of additives, and in some embodiments, there are no detectable amounts of additives, i.e., additives are substantially absent or absent from the compositions. Accordingly, the foregoing additives (except any fillers) can be individually present in an amount from 0.001 to 20 wt. %, 0.01 to 10 wt. %, or 0.01 to 5 wt. %, based on the total weight of the composition. In another embodiment, no appreciable amount of any additive other than a heat stabilizer, a mold release agent, and optionally an ultraviolet light stabilizer is present in the compositions. In still another embodiment, no detectable amount of any additive other than a heat stabilizer, a mold release agent, and optionally an ultraviolet light stabilizer is present in the compositions.

In some embodiments, the poly(arylene ether-sulfone), poly(arylene ketone), and polyetherimide polymer composition can further include at least one additional polymer. Examples of such additional polymers include and are not limited to PPSU (polyphenylene sulfone), polyetherimides, PSU (polysulfone), PPE (polyphenylene ether), PFA (perfluoroalkoxy alkane), MFA (co-polymer of TFE tetrafluoroethylene and PFVE perfluorinated vinyl ether), FEP (fluorinated ethylene propylene polymers), PPS (poly(phenylene sulfide), PTFE (polytetrafluoroethylene), PA (polyamide), PBI (polybenzimidizole), PAI (poly(amide-imide)), poly(ether sulfone), poly(aryl sulfone), polyphenylene, polybenzoxazoles, polybenzthiazoles, as well as blends and copolymers thereof. When present, the additional polymer is used in an amount from more than 0 to 20 wt. %, specifically 0.1 to 15 wt. %, and more specifically from 0.5 to 10 wt. %, all based on the total weight of the polyetherimide composition. In some embodiments, no polymer other than the polyetherimide copolymer as described herein is present in the polyetherimide copolymer composition.

Poly(arylene ether-sulfone), poly(arylene ketone), and polyetherimide polymer composition can be prepared by blending the ingredients under conditions for the formation of an intimate blend. Such conditions include melt mixing in single or twin screw-type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the polyetherimide composition prior to melt mixing. The melt mixing is often done at 290 to 340° C. to avoid excessive polymer degradation while still allowing sufficient melting to get an intimate polymer mixture free of any unbelted components. The polymer blend can also be melt filtered using a 40 to 100 micrometer candle or screen filter to remove undesirable black specks or other heterogeneous contaminants.

In an exemplary process, the poly(arylene ether-sulfone), poly(arylene ketone), and polyetherimide polymer, any additional other polymers, and any additives are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The poly(arylene ether-sulfone), poly(arylene ketone), and polyetherimide polymer composition can be formed into an article by any number of methods including shaping, extruding (including profile extrusion), thermoforming, and molding, including injection molding, compression molding, gas assist molding, structural foam molding, and blow molding. In some embodiments, a method of forming an article comprises shaping, extruding, blow molding, or injection molding the composition to form the article. Poly(arylene ether-sulfone), poly(arylene ketone), and polyetherimide polymer compositions can also formed into articles using thermoplastic processes such as film extrusion, sheet extrusion, melt casting, blown film extrusion, and calendaring. Co-extrusion and lamination processes can be used to form composite multi-layer films or sheets. The article is a sheet, film, multilayer sheet, multilayer film, molded part, extruded profile, coated part, pellets, powder, foam, fiber, fibrids, flaked fibers, or a combination comprising at least one of the foregoing.

The poly(arylene ether-sulfone), poly(arylene ketone), and polyetherimide polymer composition can be molded into an article with any equipment conventionally used for molding thermoplastic compositions, such as a Newbury or van Dorn type injection-molding machine with conventional cylinder temperatures of 250° C. to 320° C., and conventional mold temperatures of 55° C. to 120° C.

It is appreciated that in an embodiment, tetramethylene sulfone (sulfolane) can be used as an alternative to diphenyl sulfone. Accordingly, whenever diphenyl sulfone is mentioned, it can be replaced with tetramethylene sulfone (sulfolane).

The methods of the manufacture of poly(arylene ether-sulfone), poly(arylene ketone), and polyetherimide polymer compositions are further illustrated by the following non-limiting examples.

EXAMPLES

Materials

The materials in Table 1 were used or made in the following Examples.

TABLE 1

| Acronym | Description | Source |
|---|---|---|
| BPA | 2,2-Bis(4-hydroxyphenyl)propane, (Bisphenol A) | Hexion |
| $Na_2BPA$ | Bisphenol, disodium salt | Examples |
| NaOH | Sodium hydroxide | Acculute |
| DPS | Diphenyl sulfone | |
| Sulfolane | 2,3,4,5-tetrahydrothiophene-1,1-dioxide | |
| o-DCB | ortho-Dichlorobenzene | Fischer |
| 4ClPA | 4-Chlorophthalic anhydride | |
| mPD | meta-Phenylene diamine | DuPont |
| ClPAMI | 1,3-bis[N-(3- or 4-chlorophthalimido)]benzene | Examples |
| DCDPS | 4,4'-dichlorodiphenylsulfone | |
| DFBP | 4,4'-difluorobenzophenone | |

Weight average molecular weight (Mw) of the polymer product was determined by gel permeation chromatography (GPC) using polystyrene standards.

In a 20 ml glass vial, about 20 mg of the polymer sample was taken and dissolved into a quench solution (3.5 L $CH_2Cl_2$+120 mL AcOH+30 mL o-DCB) followed by filtration with 0.25 micron filter into an HPLC vial. The solution was analyzed by GPC with polystyrene standard (HPLC 2695, Waters GPC software using 2487 Dual absorbance detector of wavelength 254 nm and Mixed Bed C, PLgel 5 micrometer, 300×7.5 mm, P/N 1110-6500 column).

Thermal Gravimetric Analysis (TGA) measurements were performed with a TA Q800 TGA. The samples were heated from 40° C. to 800° C. under nitrogen or air with a heating rate of 20° C./min.

$Na_2BPA$ Slurry

A 500 mL 3-neck round bottomed flask (24/40) was equipped with an overhead stirrer through its center joint. One of the side joints was connected to a nitrogen sweep while the other was connected to a nitrogen blanket connected to a bubbler via a Dean-Stark trap with its arm wrapped in a heating tape. The flask was then charged with 11.4145 g BPA (0.05 moles, 1 equiv.) and 0.1 moles aqueous NaOH solution (Acculute). The overhead stirrer was turned on and the flask was immersed into the oil bath at 80° C. The stirring was continued for 1 h. Another 500 mL 3-neck flask with the above set-up up was charged with 200 mL o-DCB and heated to 160° C. The aqueous salt solution was slowly cannulated into the flask with o-DCB. The water and o-DCB was stripped off into the Dean-Stark with the nitrogen sweep while the salt slurry was forming. The stripping off continued until the Karl-Fisher analysis showed the moisture level <50 ppm in the overheads distillate.

Example 1. Preparation of PEI in DPS

This example shows that PEI can be prepared from the polymerization of 1,3-bis[N-(4-Chlorophthalimido)]benzene (4ClPAMI) derived from 4-Chlorophthalic anhydride (4ClPA) and metaphenylene diamine (mPD) in DPS with a Na$_2$BPA salt slurry in o-DCB.

A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then immersed into an oil bath at 170° C., and then DPS (100 g) was added. Once the DPS was completely molten, stirrer was turned on, and 5.409 g m-PD (0.05 moles, 1.0 equiv.) and 18.329 g 4ClPA (0.1004 moles, 2.008 equiv.) were added into the molten DPS (making it ~18% solid) at 170° C. The temperature was slowly increased to 200° C. The initial solution converted into a thick white slurry of ClPAMI in DPS. The heating was continued for 4 h, and the slurry became slightly thinner. At that point, the stoichiometry analysis of the reaction mixture showed the presence of 0.37 mol % of residual 4ClPA and 0.49 mol % of residual monoamine in the reaction mixture.

To the stirring slurry of ClPAMI, Na$_2$BPA salt slurry (94.31 g, 14.0% solid in oDCB, 0.0485 moles, 0.97 equiv.) was added. The temperature of the reaction mixture was increased from 170° C. to 200° C. The heating tape on the arm of the Dean-Stark trap was turned on and the o-DCB was removed from the reaction mixture with the help of nitrogen sweep. GPC analysis with polystyrene standard showed the Mw plateau of 58018 D in 18 hours with a PDI value of 2.69.

The reaction mixture was transferred into an aluminum pan to cool into room temperature. The solid polymer mixture was broken into pieces and powdered with the help of a blender. The powdered reaction mass is mixed with pH 2 DI water (1:5 ratio of the powder and water by weight) and placed in shaker for 30 min. The slurry was filtered through a wet strengthened filter paper followed by washing with DI water (1:5 ratio of power and water by weight) three times or until the water soluble salts are removed. The wet cake of powder was then mixed with 50:50 mixture of acetone/methanol mixture (1:5 ratio with powder by volume). The process was repeated three time or until the peak of DPS was undetectable in GPC analysis. The power was then dried in a vacuum oven overnight at 100° C. The product has a Tg of 215° C.

Example 2. Preparation of PEI in Sulfolane

This example shows that PEI can be prepared from the polymerization of 1,3-bis[N-(4-Chlorophthalimido)]benzene (4ClPAMI) derived from 4ClPA and methphenylene diamine (mPD) in sulfolane using a Na$_2$BPA salt slurry in o-DCB.

A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was charged with 5.409 g m-PD (0.05 moles, 1.0 equiv.) and 18.329 g 4ClPA (0.1004 moles, 2.008 equiv.) followed by the addition of warm sulfolane (making it ~18% solid) at 170° C. The temperature was slowly increased to 200° C. The initial solution converted into a thick white slurry of 4ClPAMI in sulfolane. The heating was continued for 4 h and the slurry became slightly thinner. At that point, the stoichiometry analysis of the reaction mixture showed the presence of 0.82 mol % of residual 4ClPA and 0.94 mol % of residual monoamine in the reaction mixture.

To the stirring slurry of 4ClPAMI, Na$_2$BPA salt slurry (97.37 g, 13.7% solid in oDCB, 0.049 moles, 0.98 equiv.) was added. The temperature of the reaction mixture was increased from 170° C. to 200° C. The heating tape on the arm of the Dean-Stark trap was turned on, and the o-DCB was stripped off the reaction mixture with the help of nitrogen sweep. GPC analysis with polystyrene standard showed the Mw plateau of 51204 D in 12 hours with a PDI value of 2.91.

The polymer reaction mixture was slowly poured into stirring pH2 water in a jar. The reaction mixture was powdered further with the help of blender and placed in a shaker for 30 min. The slurry was filtered and washed with DI water (1:5 ratio of powder and water) three times, or until the water soluble impurities are removed. The powder wet cake was mixed with 50:50 mixture of acetone/methanol and washed two times. The powder was then dried in a vacuum oven overnight at 100° C. The product has a Tg of 219° C.

Example 3. Preparation of PEEK in DPS

This example shows that poly(ether ether ketone) (PEEK) can be prepared from the polymerization of 4,4'-difluorobenzophenone (DFBP) in DPS with a Na$_2$BPA salt slurry in o-DCB.

A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then immersed into an oil bath at 170° C., and then DPS (100 g) was added. Once the DPS was completely molten, stirrer was turned on, and DFBP (13.092 g, 0.06 moles) was added.

To the stirring solution of DFBP in DPS, Na$_2$BPA salt slurry (96.36 g, 16.45% solid in o-DCB, 0.0582 moles, 0.97 equiv.) was added. The temperature of the reaction mixture was increased from 170° C. to 200° C. The heating tape on the arm of the Dean-Stark trap was turned on, and the o-DCB was stripped off the reaction mixture with the help of nitrogen sweep. GPC analysis with polystyrene standard showed the Mw plateau of 52001 D in 5 hours with a PDI value of 1.67.

The polymer is isolated as described in example 1. The isolated polymer has a Tg of 159° C. and TGA onset weight loss temperatures of 517° C. in nitrogen and 508° C. in air.

Example 4. Preparation of PEEK in Sulfolane

This example shows that PEEK can be prepared from the polymerization of 4,4'-difluorobenzophenone (DFBP) in sulfolane with a Na$_2$BPA salt slurry in o-DCB.

A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then charged with DFBP (13.092 g, 0.06 moles) followed by 100 g sulfolane and then immersed into an oil bath at 170° C. with stirring with overhead stirrer.

To the stirring solution of DFBP in sulfolane, $Na_2BPA$ salt slurry (96.36 g, 16.45% solid in o-DCB, 0.0582 moles, 0.97 equiv.) was added. The temperature of the reaction mixture was increased from 170° C. to 200° C. The heating tape on the arm of the Dean-Stark trap was turned on, and the o-DCB was stripped off the reaction mixture with the help of nitrogen sweep. GPC analysis with polystyrene standard showed the Mw plateau of 38986 D in 28 hours with a PDI value of 1.67.

The polymer is isolated as described in example 2. The isolated polymer has a Tg of 147° C. and TGA onset weight loss temperatures of 542° C. in nitrogen and 538° C. in air.

Example 5. Preparation of Polyethersulfone in DPS

This example shows that a polyethersulfone can be prepared from the polymerization of 4,4'-dichlorodiphenylsulfone (DCDPS) in DPS with a $Na_2BPA$ salt slurry in o-DCB.

A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then immersed into an oil bath at 170° C., and then DPS (100 g) was added. Once the DPS was completely molten, stirrer was turned on, and DCDPS (14.358 g, 0.05 moles) was added.

To the stirring solution of DCDPS in DPS, $Na_2BPA$ salt slurry (91.07 g, 14.5% solid in o-DCB, 0.0485 moles, 0.97 equiv.) was added. The temperature of the reaction mixture was increased from 170° C. to 200° C. The heating tape on the arm of the Dean-Stark trap was turned on, and the o-DCB was stripped off the reaction mixture with the help of nitrogen sweep. GPC analysis with polystyrene standard showed the Mw plateau of 68844 D in 50 hours with a PDI value of 1.73.

The polymer is isolated as described in example 1. The isolated polymer has a Tg of 191° C. and TGA onset weight loss temperatures of 521° C. in nitrogen and 525° C. in air.

Example 6. Preparation of Polyethersulfone in Sulfolane

This example shows that a polyethersulfone can be prepared from the polymerization of 4,4'-dichlorodiphenylsulfone (DCDPS) in sulfolane with a $Na_2BPA$ salt slurry in o-DCB.

A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then charged with DCDPS (14.358 g, 0.05 moles) followed by 100 g sulfolane and then immersed into an oil bath at 170° C. with stirring with overhead stirrer.

To the stirring solution of DFBP in sulfolane, $Na_2BPA$ salt slurry (91.07 g, 14.5% solid in oDCB, 0.0485 moles, 0.97 equiv.) was added. The temperature of the reaction mixture was increased from 170° C. to 200° C. The heating tape on the arm of the Dean-Stark trap was turned on, and the o-DCB was stripped off the reaction mixture with the help of nitrogen sweep. GPC analysis with polystyrene standard showed the Mw plateau of 55739 D in 4 hours with a PDI value of 4.65.

The polymer is isolated as described in Example 2. The isolated polymer has a Tg of 189° C. and TGA onset weight loss temperatures of 526° C. in nitrogen and 530° C. in air.

Example 7. Preparation of PEI-Polyethersulfone Copolymer in DPS

This example demonstrates that the ClPAMI composition containing diphenyl sulfone can be reacted with $Na_2BPA$ slurry and DCDPS directly without purification to prepare a copolymer of polyetherimide and polyethersulfone. No catalyst is needed for the polymerization.

A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then immersed into an oil bath at 170° C., and DPS (100 g) was added. Once the DPS was completely molten, stirrer was turned on and 3.245 g m-PD (0.03 moles, 1.0 equiv.) and 10.997 g 4ClPA (0.06 moles, 2.008 equiv.) were added into the molten DPS (making it ~18% solid) at 170° C. The temperature was slowly increased to 200° C. The initial solution converted into a thick white slurry of ClPAMI in DPS. The heating was continued for 4 h and the slurry became slightly thinner. At that point, the stoichiometry analysis of the reaction mixture showed the presence of 0.32 mol % of residual 4ClPA and 0.21 mol % of residual monoamine in the reaction mixture.

To the stirring slurry of ClPAMI, DCDPS (8.615 g, 0.03 moles, 1.0 equiv.) was added and stirred for 10 min followed by the addition of $Na_2BPA$ salt slurry (94.31 g, 14.0% solid in o-DCB, 0.0485 moles, 0.97 equiv.). The o-DCB was removed from the reaction mixture with the nitrogen sweep. GPC analysis with polystyrene standard showed the Mw plateau of 38108 D in 26 hours with PDI 2.6.

The polymer mixture was poured into an aluminum pan without quenching and allowed to cool. The solidified polymer solution was broken into pieces and powdered using a blender. The polymer was washed with acetone (3×500 mL). The cake was mixed with 500 mL pH 2 DI water (acidified with HCl) and shaken for 30 min followed by filtration and the washing with DI water (3×500 mL). The polymer cake was finally washed with additional 100 mL acetone and dried in vacuum oven at 150° C.

Example 8. Preparation of PEI-PEEK Copolymer in DPS

The example demonstrates that the ClPAMI composition containing DPS can be reacted with a $Na_2BPA$ slurry and DFBP directly without purification to prepare a copolymer of PEI-PEEK. No catalyst is needed for the polymerization.

Following the procedure described in example 1, 3.245 g m-PD (0.03 moles) and 10.997 g 4ClPA (0.0602 moles) were used to synthesize 4ClPAMI in 100 g DPS. Once the ClPAMI synthesized, DFBP (6.546 g, 0.03 moles) was added.

To the stirring solution of ClPAMI and DFBP in DPS, $Na_2BPA$ salt slurry (104.67 g, 15.14% solid in o-DCB, 0.0582 moles, 0.97 equiv.) was added. The temperature of the reaction mixture was increased from 170° C. to 200° C. The heating tape on the arm of the Dean-Stark trap was turned on, and the o-DCB was stripped off the reaction mixture with the help of nitrogen sweep. GPC analysis with polystyrene standard showed the Mw plateau of 38773 D in 7 hours with a PDI value of 2.27.

The polymer is isolated as described in example 1. The isolated polymer has a Tg of 187° C. and TGA onset weight loss temperatures of 483° C. in nitrogen and 499° C. in air.

Example 9. Preparation of PEI-PEEK Copolymer in DPS

This example demonstrates that the ClPAMI composition containing diphenyl sulfone can be reacted with $Na_2BPA$ slurry and DFBP directly without purification to prepare a copolymer of polyetherimide and polyetheretherketone. No catalyst is needed for the polymerization.

Following the procedure described in example 1, 3.245 g m-PD (0.03 moles, 1.0 equiv.) and 10.997 g 4ClPA (0.06 moles, 2.008 equiv.) were used to synthesize ClPAMI with 4ClPA and monoamine residues respectively 0.52 and 0.37 mol %. To the stirring slurry of ClPAMI, 4,4'-difluorobenzophenone (DFBP) (7.533 g, 0.03 moles, 1.0 equiv.) was added and stirred for 10 min followed by the addition of $Na_2BPA$ salt slurry (87.79 g, 15.04% solid in oDCB, 0.0485 moles, 0.97 equiv.). GPC analysis with polystyrene standard showed the Mw plateau of 40126 D in 8 hours with PDI 2.97. The copolymer was isolated as described in Example 1.

Example 10. Preparation of PEI-PEEK Copolymer in Sulfolane

This examples demonstrates that PEI-PEEK copolymer can be prepared from polymerization of 1,3-bis[N-(4-Chlorophthalimido)]benzene (4ClPAMI) and 4,4'-difluorobenzophenone (DFBP) in sulfolane using $Na_2BPA$ salt slurry in o-DCB.

Following the procedure described in example 2, 3.245 g m-PD (0.03 moles) and 10.997 g 4ClPA (0.0602 moles) were used to synthesize 4ClPAMI in 100 g sulfolane. Once the ClPAMI synthesized, DFBP (6.546 g, 0.03 moles) was added.

To the stirring solution of ClPAMI and DFBP in sulfolane, $Na_2BPA$ salt slurry (96.36 g, 16.45% solid in oDCB, 0.0582 moles, 0.97 equiv.) was added. The temperature of the reaction mixture was increased from 170° C. to 200° C. The heating tape on the arm of the Dean-Stark trap was turned on and the ODCB was stripped off the reaction mixture with the help of nitrogen sweep. GPC analysis with polystyrene standard showed the Mw plateau of 23013 D in 5 hours with a PDI value of 2.15.

The polymer is isolated as described in example 2. The isolated polymer has a Tg of 181° C. and TGA onset weight loss temperatures of 524° C. in nitrogen and 525° C. in air.

Example 11. Preparation of PEI-Polyethersulfone Copolymer in DPS

This example demonstrates that ClPAMI composition containing DPS can be reacted with DCDPS and a $Na_2BPA$ slurry directly without purification to prepare a copolymer of PEI-polyethersulfone. No catalyst is needed for the polymerization.

Following the procedure described in example 1, 3.245 g m-PD (0.03 moles) and 10.997 g 4ClPA (0.0602 moles) were used to synthesize 4ClPAMI in 100 g DPS. Once the ClPAMI synthesized, DCDPS (8.6148 g, 0.03 moles) was added.

To the stirring solution of ClPAMI and DCDPS in DPS, $Na_2BPA$ salt slurry (109.29 g, 14.5% solid in oDCB, 0.0582 moles, 0.97 equiv.) was added. The temperature of the reaction mixture was increased from 170° C. to 200° C. The heating tape on the arm of the Dean-Stark trap was turned on, and the ODCB was stripped off the reaction mixture with the help of nitrogen sweep. GPC analysis with polystyrene standard showed the Mw plateau of 38108D in 26 hours with a PDI value of 2.6.

The polymer is isolated as described in example 1. The isolated polymer has a Tg of 201° C. and TGA onset weight loss temperatures of 489° C. in nitrogen and 452° C. in air.

Example 12. Preparation of PEI-Polyethersulfone Copolymer in Sulfolane

This example demonstrates that the ClPAMI composition containing sulfolane can be reacted with $Na_2BPA$ slurry and DCDPS directly without purification to prepare a copolymer of polyetherimide and polyethersulfone. No catalyst is needed for the polymerization.

A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was charged with 3.245 g m-PD (0.03 moles, 1.0 equiv.) and 10.997 g 4ClPA (0.06 moles, 2.008 equiv.) followed by the addition of warm sulfolane (making it ~12% solid) at 170° C. and the temperature was slowly increased to 200° C. The initial solution converted into a thick white slurry of ClPAMI in sulfolane. The heating was continued for 4 h and the slurry became slightly thinner. At that point, the stoichiometry analysis of the reaction mixture showed the presence of 0.82 mol % of residual 4ClPA and 0.63 mol % of residual monoamine in the reaction mixture.

To the stirring slurry of 4ClPAMI, 4,4'-Dichlorodiphenylsulfone (DCDPS) (8.615 g, 0.03 moles, 1.0 equiv.) was added followed by the addition of $Na_2BPA$ salt slurry (97.37 g, 13.7% solid in o-DCB, 0.049 moles, 0.98 equiv.). The temperature of the reaction mixture was increased from 170° C. to 200° C. The heating tape on the arm of the Dean-Stark trap was turned on and the o-DCB was stripped off the reaction mixture with nitrogen sweep. GPC analysis with polystyrene standard showed the Mw plateau of 38877 D in 12 hours with PDI 2.38.

The diluted solution was poured slowly as a thin stream into a 2 L beaker containing 1 L DI water stirring slowly with overhead stirrer. The polymer solution was solidified as ling circular string which was then crushed and blended to a powder. The polymer powder was filtered and washed with water multiple times to remove the sulfolane. The powdered polymer was dried in a vacuum oven.

Example 13. Preparation of PEEK-Polyethersulfone Copolymer in DPS

This example demonstrates that PEEK-polyethersulfone copolymer can be prepared from the polymerization of 4,4'-difluorobenzophenone (DFBP) and 4,4'-dichlorodiphenylsulfone (DCDPS) in DPS with a Na2BPA salt slurry in o-DCB.

A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then immersed into an oil bath at 170° C., and DPS (100 g) was added. Once the DPS was completely molten, stirrer was turned on, and DFBP (6.546 g, 0.03 moles) and DCDPS (8.615 g, 0.03 moles) were added.

To the stirring solution of DFBP and DCDPS in DPS, Na$_2$BPA salt slurry (96.36 g, 16.45% solid in oDCB, 0.0582 moles, 0.97 equiv.) was added. The temperature of the reaction mixture was increased from 170° C. to 200° C. The heating tape on the arm of the Dean-Stark trap was turned on, and the o-DCB was stripped off the reaction mixture with the help of nitrogen sweep. GPC analysis with polystyrene standard showed the Mw plateau of 38746 D in 48 hours with a PDI value of 3.02.

The polymer is isolated as described in example 1. The isolated polymer has a Tg of 168° C. and TGA onset weight loss temperatures of 519° C. in nitrogen and 521° C. in air.

Example 14. Preparation of PEI-PEEK-Polyethersulfone Copolymer in DPS

This example demonstrates that PEI-PEEK-polyethersulfone copolymer can be prepared from the polymerization of 1,3-bis[N-(4-Chlorophthalimido)]benzene (4ClPAMI), 4,4'-difluorobenzophenone (DFBP) and 4,4'-dichlorodiphenylsulfone (DCDPS) in DPS with a Na$_2$BPA salt slurry in o-DCB. No catalyst is needed for the polymerization.

Following the procedure described in example 1, 2.1636 g m-PD (0.02 moles) and 7.3316 g 4ClPA (0.0402 moles) were used to synthesize 4ClPAMI in 100 g DPS. Once the ClPAMI synthesized, DFBP (4.364 g, 0.02 moles) and DCDPS (5.743 g, 0.02 moles) were added.

To the stirring solution of ClPAMI and DCDPS in DPS, Na$_2$BPA salt slurry (96.36 g, 16.45% solid in oDCB, 0.0582 moles, 0.97 equiv.) was added. The temperature of the reaction mixture was increased from 170° C. to 200° C. The heating tape on the arm of the Dean-Stark trap was turned on, and the o-DCB was stripped off the reaction mixture with the help of nitrogen sweep. GPC analysis with polystyrene standard showed the Mw plateau of 30850 D in 32 hours with a PDI value of 2.34.

The polymer is isolated as described in example 1. The isolated polymer has a Tg of 170° C. and TGA onset weight loss temperatures of 491° C. in nitrogen and 505° C. in air.

Example 15. Preparation of PEI-PEEK-Polyethersulfone Copolymer in Sulfolane

This example demonstrates that PEI-PEEK-polyethersulfone copolymer can be prepared from the polymerization of 1,3-bis[N-(4-Chlorophthalimido)]benzene (4ClPAMI), 4,4'-difluorobenzophenone (DFBP) and 4,4'-dichlorodiphenylsulfone (DCDPS) in sulfolane with a Na$_2$BPA salt slurry in o-DCB. No catalyst is needed for the polymerization.

Following the procedure described in example 1, 2.1636 g m-PD (0.02 moles) and 7.3316 g 4ClPA (0.0402 moles) were used to synthesize 4ClPAMI in 100 g DPS. Once the ClPAMI synthesized, DFBP (4.364 g, 0.02 moles) and DCDPS (5.743 g, 0.02 moles) were added.

To the stirring solution of ClPAMI and DCDPS in DPS, Na$_2$BPA salt slurry (96.36 g, 16.45% solid in oDCB, 0.0582 moles, 0.97 equiv.) was added. The temperature of the reaction mixture was increased from 170° C. to 200° C. The heating tape on the arm of the Dean-Stark trap was turned on, and the o-DCB was stripped off the reaction mixture with the help of nitrogen sweep. GPC analysis with polystyrene standard showed the Mw plateau of 17830 D in 5 hours with PDI 2.42.

The polymer is isolated as described in example 2. The isolated polymer has a Tg of 176° C. and TGA onset weight loss temperatures of 519° C. in nitrogen and 514° C. in air.

Set forth below are various embodiments of the disclosure. Embodiment 1. A method for the manufacture of a poly(arylene ether-sulfone), a poly(arylene ketone), or a copolymer thereof, the method comprising: polymerizing a substituted aromatic compound of the formula

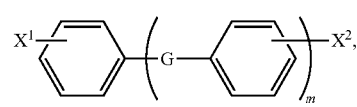

and an alkali metal salt of a dihydroxy aromatic compound of the formula MO—Z—OM in the presence of diphenyl sulfone or sulfolane or a combination comprising at least one of the foregoing solvents to form a poly(arylene ether-sulfone), a poly(arylene ketone), or a copolymer thereof comprising structural units of the formula

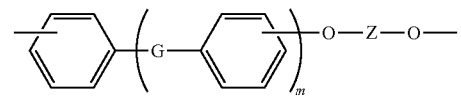

wherein in the foregoing formulas $X^1$ and $X^2$ are each independently fluoro, chloro, bromo, iodo, nitro, or a combination comprising at least one of the foregoing; M is an alkali metal; Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing; G is —C(O)— or —SO$_2$—; and m is 1 or 2.

Embodiment 2. A method for the manufacture of a polyetherimide copolymer composition, the method comprising contacting a substituted phthalic anhydride and an organic diamine in the presence of diphenyl sulfone or sulfolane or a combination comprising at least one of the foregoing solvents at a temperature of greater than 130° C., wherein the substituted phthalic anhydride has a formula

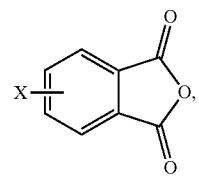

and the organic diamine has a formula H$_2$N—R—NH$_2$ to provide a bis(phthalimide) composition comprising diphenyl sulfone or sulfolane or a combination comprising at least one of the foregoing solvent and a bis(phthalimide) of the formula

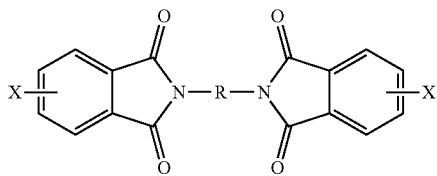

and copolymerizing the bis(phthalimide), a substituted aromatic compound of the formula

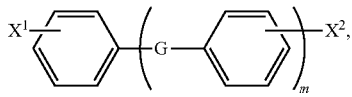

and an alkali metal salt of a dihydroxy aromatic compound of the formula MO—Z—OM in the presence of diphenyl sulfone or sulfolane or a combination comprising at least one of the foregoing solvents to form a polyetherimide copolymer comprising structural units of the formulas

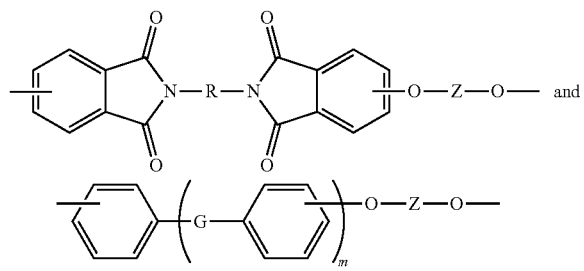

wherein in the foregoing formulae, X, $X^1$, and $X^2$ are each independently fluoro, chloro, bromo, iodo, nitro, or a combination comprising at least one of the foregoing; R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —($C_6H_{10}$)$_z$— wherein z is an integer from 1 to 4, an aromatic hydrocarbyl moiety having from 1 to 6 aromatic groups, and a divalent group of the formula

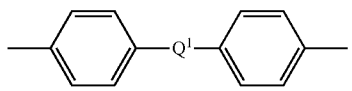

wherein $Q^1$ is —O—, —S—, —C(O)—, —$SO_2$—, —SO—, —$C_yH_{2y}$— wherein y is an integer from 1 to 5, or a combination comprising at least one of the foregoing; M is an alkali metal; Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing; G is —C(O)— or —$SO_2$—; and m is 1 or 2.

Embodiment 3. The method of Embodiment 2, wherein the stoichiometric ratio of the substituted phthalic anhydride to the organic diamine is 1.95:1 to 2.05:1.

Embodiment 4. The method of Embodiment 2 or Embodiment 3, wherein $$\frac{\text{weight of bis(phthalimide)}}{\text{weight of bis(phthalimide)} + \text{weight of diphenyl sulphone or sulfolane}}(100)$$

is 1 to 30%, specifically 15 to 25%, preferably 18 to 22%.

Embodiment 5. The method of any one or more of Embodiments 2 to 4, comprising copolymerizing the bis(phthalimide), the substituted aromatic compound, and the alkali metal salt in the presence of an endcapping agent.

Embodiment 6. The method of any one or more of Embodiments 2 to 5, further comprising heating the diphenyl sulfone to a temperature of greater than 130° C., and combining the substituted phthalic anhydride and the organic diamine with the heated diphenyl sulfone.

Embodiment 7. The method of any one or more of Embodiments 2 to 6, further comprising adding a monofunctional reactant to the substituted phthalic anhydride, the organic diamine, the diphenyl sulfone, sulfolane, or a combination comprising at least one of the foregoing.

Embodiment 8. The method of any one or more of Embodiments 2 to 7, wherein the contacting is conducted at a temperature of 130° C. to 250° C.

Embodiment 9. The method of any one or more of Embodiments 2 to 8, wherein the contacting is conducted in the absence of an imidization catalyst.

Embodiment 10. The method of any one or more of Embodiments 1 to 9, wherein the polymerization or copolymerization is conducted in the absence of a polymerization catalyst.

Embodiment 11. The method of any one or more of Embodiments 1 to 9, wherein the polymerization or copolymerization is conducted in the presence of a polymerization catalyst.

Embodiment 12. The method of any one or more of Embodiments 1 to 11, wherein the molar ratio of the alkali salt of the dihydroxy aromatic compound to the total of the bis(phthalimide) and the substituted aromatic compound is in the range of 0.95:1 to 1.1:1.

Embodiment 13. The method of any one or more of Embodiments 1 to 12, wherein the polymerization or copolymerization is conducted at a temperature of 130° C. to 250° C.

Embodiment 14. The method of any one or more of Embodiments 1 to 13, wherein X is chloro, $X^1$ and $X^2$ are each independently chloro or fluoro, m is 1, and R is m-phenylene, p-phenylene, an arylene ether, a diarylsulfone, a group of the formula

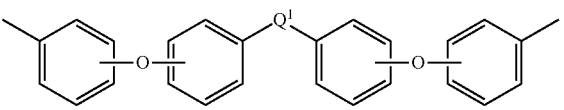

wherein $Q^1$— is a single bond, —O—, —S—, —C(O)—, —$SO_2$—, —SO—, —$C_yH_{2y}$, wherein y is an integer from 1 to 5, or a combination comprising at least one of the foregoing, preferably wherein R is m-phenylene, p-phenylene, para, para-diphenyl ether, 4,4-diphenylsulfone, or a combination comprising at least one of the foregoing.

Embodiment 15. The method of any one or more of Embodiments 1 to 14, wherein the dihydroxy aromatic compound comprises bisphenol A, hydroquinone, biphenol, resorcinol, or a combination comprising at least one of the foregoing.

Embodiment 16. The method of any one or more of Embodiments 1 to 15, wherein the substituted aromatic compound is 4,4'-difluorobenzophenone, 4,4'-dichlorodiphenylsulfone, or a combination comprising at least one of the foregoing.

Embodiment 17. The method of any one or more of Embodiments 1 to 16, wherein the dihydroxy aromatic compound is dispersed in a solvent comprising ortho-dichlorobenzene, xylenes, toluene, diphenyl sulfone, sulfolane, or a combination comprising at least one of the foregoing, preferably the dihydroxy aromatic compound is dispersed in ortho-dichlorobenzene.

Embodiment 18. The method of any one or more of Embodiments 2 to 17, wherein the bis(phthalimide) composition and the polyetherimide copolymer composition are manufactured in the same vessel.

Embodiment 19. The method of Embodiment 2, the method comprising: contacting a substituted phthalic anhydride and an organic diamine in the presence of diphenyl sulfone, sulfolane, or a combination comprising at least one of the foregoing solvents at a temperature of 130° C. to 250° C., wherein the substituted phthalic anhydride has a formula

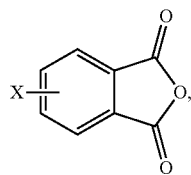

and the organic diamine has a formula $H_2N-R-NH_2$ to provide a bis(phthalimide) composition comprising diphenyl sulfone, sulfolane, or a combination comprising at least one of the foregoing solvents and a bis(phthalimide) of the formula

and copolymerizing the bis(phthalimide), a substituted aromatic compound of the formula

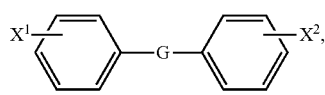

and a disodium salt or a dipotassium salt of bisphenol A in the presence of diphenyl sulfone, sulfolane, or a combination comprising at least one of the foregoing solvents to form a polyetherimide copolymer comprising structural units of the formulas

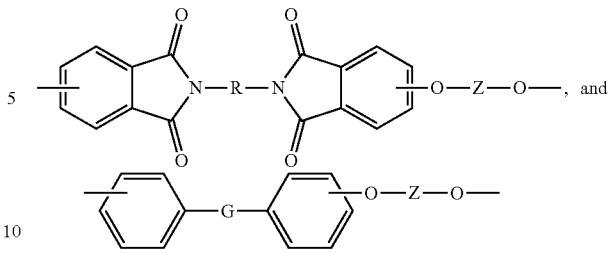

wherein in the foregoing formulae, X is chloro; $X^1$ and $X^2$ are each independently chloro, fluoro, bromo, iodo, or nitro; R is m-phenylene, p-phenylene, p,p-diphenylether, or 4,4'-diphenylsulfone; Z is

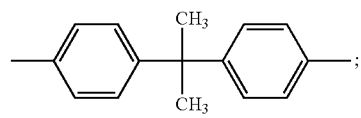

and G is —C(O)— or —SO$_2$—.

Embodiment 20. A polymer composition manufactured by a method of any one of Embodiments 1 to 19.

Embodiment 21. The composition of Embodiment 18, wherein the composition comprises a poly(arylene ethersulfone), a poly(arylene ketone), or a copolymer thereof comprising structural units of the formula

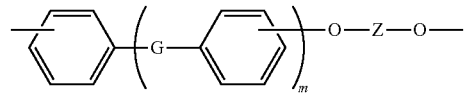

wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing; each occurrence of G is independently —C(O)— or —SO$_2$—; and m is 1 or 2; and wherein the composition comprises one or more of greater than 0.1 parts per million of diphenyl sulfone, sulfolane, or a combination comprising at least one of the foregoing, or greater than 1 part per million of sodium or potassium, or a yellowness index of less than 300.

Embodiment 22. A polyetherimide copolymer composition wherein the polyetherimide copolymer comprises structural units of the formulas

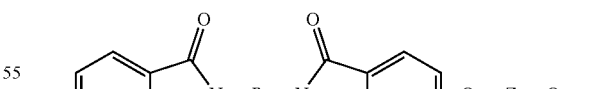

and

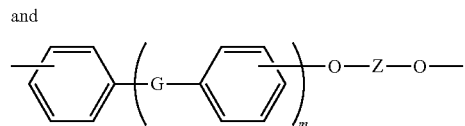

wherein R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —(C$_6$H$_{10}$)$_z$— wherein z is an integer from 1 to 4, an aromatic hydrocarbyl moiety having from 1 to 6 aromatic groups, and a divalent group of the formula

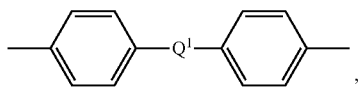

wherein Q$^1$ is —O—, —S—, —C(O)—, —SO$_2$—, —SO—, —C$_y$H$_{2y}$— wherein y is an integer from 1 to 5, or a combination comprising at least one of the foregoing; and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing; G is —C(O)— or —SO$_2$—; and m is 1 or 2; preferably wherein R is m-phenylene, p-phenylene, p,p-diphenylether, or 4,4'-diphenylsulfone; Z is

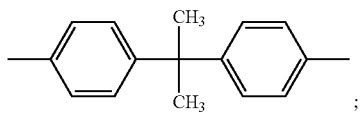

and m is 1; and wherein the composition comprises one or more of greater than 0.1 parts per million of diphenyl sulfone, sulfolane, or a combination comprising at least one of the foregoing, or greater than 1 part per million of sodium or potassium, or a yellowness index of less than 300.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

All references cited herein are incorporated by reference in their entirety.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:
1. A method for the manufacture of a polyetherimide copolymer composition, the method comprising
contacting a substituted phthalic anhydride and an organic diamine in the presence of sulfolane at a temperature of greater than 130° C., wherein the substituted phthalic anhydride has a formula

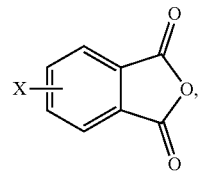

and
the organic diamine has a formula

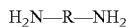

to provide a bis(phthalimide) composition comprising sulfolane and a bis(phthalimide) of the formula

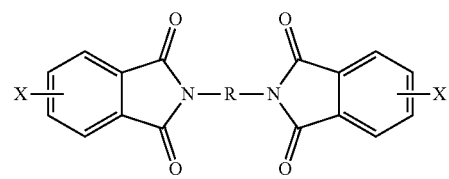

and
copolymerizing the bis(phthalimide), a substituted aromatic compound of the formula

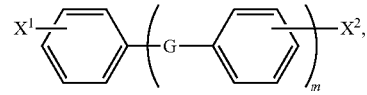

and an alkali metal salt of a dihydroxy aromatic compound of the formula

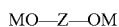

in the presence of sulfolane to form a polyetherimide copolymer comprising structural units of the formulas

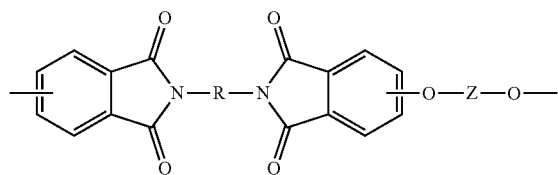

and

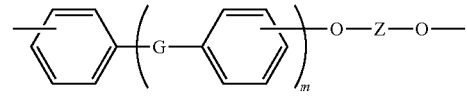

wherein in the foregoing formulae
X, X$^1$, and X$^2$ are each independently fluoro, chloro, bromo, iodo, nitro, or a combination comprising at least one of the foregoing;
R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —(C$_6$H$_{10}$)$_z$— wherein z is an integer from 1 to 4, an aromatic hydrocarbyl moiety having from 1 to 6 aromatic groups, and a divalent group of the formula

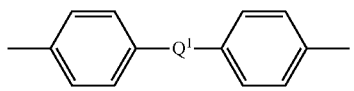

wherein $Q^1$ is —O—, —S—, —C(O)—, —SO$_2$—, —SO—, —C$_y$H$_{2y}$— wherein y is an integer from 1 to 5, or a combination comprising at least one of the foregoing;
M is an alkali metal;
Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing;
G is —C(O)— or —SO$_2$—; and
m is 1 or 2.

2. The method of claim 1, wherein the stoichiometric ratio of the substituted phthalic anhydride to the organic diamine is 1.95:1 to 2.05:1.

3. The method of claim 1, wherein $$\frac{\text{weight of bis(phthalimide)}}{\text{weight of bis(phthalimide)} + \text{weight of sulfolane}}(100)$$

is 1 to 30%.

4. The method of claim 1, comprising copolymerizing the bis(phthalimide), the substituted aromatic compound, and the alkali metal salt in the presence of an endcapping agent.

5. The method of claim 1, further comprising adding a monofunctional reactant to the substituted phthalic anhydride, the organic diamine, or sulfolane.

6. The method of claim 1, wherein the contacting is conducted at a temperature of 130° C. to 250° C.

7. The method of claim 1, wherein the contacting is conducted in the absence of an imidization catalyst.

8. The method of claim 1, wherein the polymerization or copolymerization is conducted in the absence of a polymerization catalyst.

9. The method of claim 1, wherein the polymerization or copolymerization is conducted in the presence of a polymerization catalyst.

10. The method of claim 1, wherein the polymerization or copolymerization is conducted at a temperature of 130° C. to 250° C.

11. The method of claim 1, wherein X is chloro, $X^1$ and $X^2$ are each independently chloro or fluoro, m is 1, and R is m-phenylene, p-phenylene, an arylene ether, a diarylsulfone, a group of the formula

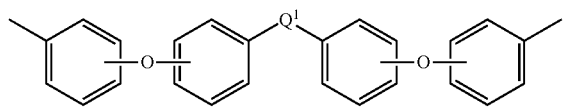

wherein $Q^1$ —is a single bond, —O—, —S—, —C(O)—, —SO$_2$—, —SO—, —C$_y$H$_{2y}$— wherein y is an integer from 1 to 5, or a combination comprising at least one of the foregoing.

12. The method of claim 1, wherein the dihydroxy aromatic compound comprises bisphenol A, hydroquinone, biphenol, resorcinol, or a combination comprising at least one of the foregoing.

13. The method of claim 1, wherein the substituted aromatic compound is 4,4'-difluorobenzophenone, 4,4'-dichlorodiphenylsulfone, or a combination comprising at least one of the foregoing.

14. The method of claim 1, wherein the alkali metal salt of a dihydroxy aromatic compound is dispersed in a solvent comprising ortho-dichlorobenzene, xylenes, toluene, diphenyl sulfone, sulfolane, or a combination comprising at least one of the foregoing.

15. The method of claim 1, the method comprising:
contacting a substituted phthalic anhydride and an organic diamine in the presence of sulfolane at a temperature of 130° C. to 250° C.,
wherein the substituted phthalic anhydride has a formula

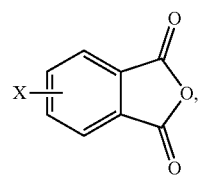

and
the organic diamine has a formula

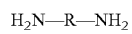

to provide a bis(phthalimide) composition comprising sulfolane and a bis(phthalimide) of the formula

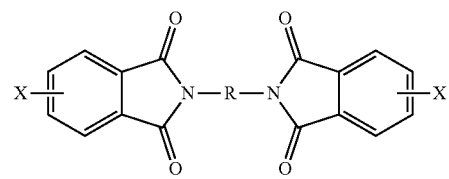

and
copolymerizing the bis(phthalimide), a substituted aromatic compound of the formula

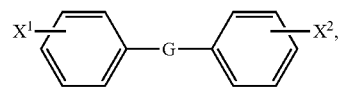

and a disodium salt or a dipotassium salt of bisphenol A in the presence of sulfolane to form a polyetherimide copolymer comprising structural units of the formulas

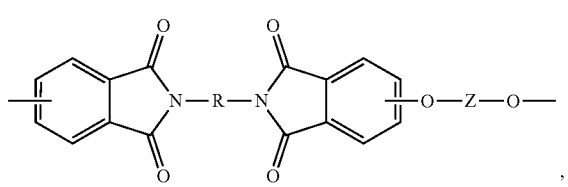

-continued and

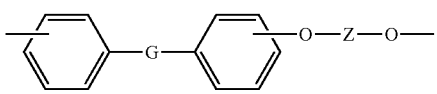

wherein in the foregoing formulae
X is chloro;
$X^1$ and $X^2$ are each independently chloro, fluoro, bromo, iodo, or nitro;
R is m-phenylene, p-phenylene, p,p-diphenylether, or 4,4'-diphenylsulfone;
Z is

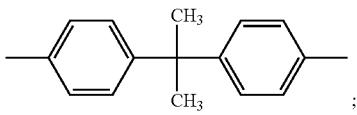

and
G is —C(O)— or —SO$_2$—.

16. The method of claim 1, wherein $$\frac{\text{weight of bis(phthalimide)}}{\text{weight of bis(phthalimide)} + \text{weight of sulfolane}}(100)$$

is 15 to 25%.

17. The method of claim 1, wherein $$\frac{\text{weight of bis(phthalimide)}}{\text{weight of bis(phthalimide)} + \text{weight of sulfolane}}(100)$$

is 18 to 22%.

18. The method of claim 11, wherein R is m-phenylene, p-phenylene, para, para-diphenyl ether, 4,4-diphenylsulfone, or a combination comprising at least one of the foregoing.

* * * * *